United States Patent
Bowles

(10) Patent No.: US 9,186,960 B2
(45) Date of Patent: Nov. 17, 2015

(54) ASSEMBLIES TO ARTICULATE A VEHICLE BACKLITE

(71) Applicant: Webasto-Edscha Cabrio GmbH, Stockdorf (DE)

(72) Inventor: Jason Bowles, Owosso, MI (US)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 30 days.

(21) Appl. No.: 13/916,540

(22) Filed: Jun. 12, 2013

(65) Prior Publication Data

US 2014/0224440 A1  Aug. 14, 2014

Related U.S. Application Data

(60) Provisional application No. 61/764,271, filed on Feb. 13, 2013.

(51) Int. Cl.
B60J 1/20 (2006.01)
B60J 1/18 (2006.01)

(52) U.S. Cl.
CPC ..................................... B60J 1/1823 (2013.01)

(58) Field of Classification Search
USPC ................................ 296/147, 146.14, 146.16
See application file for complete search history.

(56) References Cited

U.S. PATENT DOCUMENTS

| | | | |
|---|---|---|---|
| 2,436,728 A * | 2/1948 | Parsons | 296/146.16 |
| 2,714,035 A * | 7/1955 | Limberg et al. | 49/260 |
| 2,747,921 A * | 5/1956 | Hooverson et al. | 296/146.16 |
| 2,762,648 A * | 9/1956 | Huzzard | 296/64 |
| 2,836,457 A * | 5/1958 | Berman et al. | 296/146.16 |
| 2,957,725 A * | 10/1960 | Ford et al. | 296/107.2 |
| 3,236,557 A * | 2/1966 | Podolan | 296/145 |
| 3,332,169 A * | 7/1967 | Lohr et al. | 49/249 |
| 3,333,362 A * | 8/1967 | Kostin et al. | 49/248 |
| 3,347,592 A * | 10/1967 | Renneker | 296/107.2 |
| 3,536,354 A * | 10/1970 | Ingram | 296/147 |
| 4,383,392 A * | 5/1983 | La Conte | 49/205 |
| 4,543,747 A * | 10/1985 | Kaltz et al. | 49/249 |
| 4,626,020 A * | 12/1986 | Kaltz et al. | 296/146.14 |
| 4,852,935 A * | 8/1989 | Varner | 296/146.14 |
| 4,854,634 A * | 8/1989 | Shiraishi et al. | 296/108 |
| 5,078,447 A * | 1/1992 | Klein et al. | 296/107.2 |
| 5,209,544 A * | 5/1993 | Benedetto et al. | 296/107.18 |
| 6,419,308 B1 * | 7/2002 | Corder et al. | 296/216.02 |

(Continued)

FOREIGN PATENT DOCUMENTS

DE  19913033 A1  10/2000
DE  10200221 A1  7/2003

(Continued)

*Primary Examiner* — Katherine Mitchell
*Assistant Examiner* — Justin Rephann
(74) *Attorney, Agent, or Firm* — Fitch, Even, Tabin & Flannery LLP

(57) ABSTRACT

Assemblies and methods to articulate a movable surface such as a window covering an opening of a vehicle from closed to open positions using a pivoting armature are provided. An assembly includes a backlite pane pivotably attached about an axis fixed with respect to the vehicle; at least one lever assembly pivotably connected to the backlite pane to permit articulating movement of the backlite pane; and a motive force connected to a driveshaft connected to the at least one lever assembly such that rotation of the driveshaft in response to the motive force causes movement of the at least one lever assembly and articulation of the backlite pane.

16 Claims, 22 Drawing Sheets

(56) References Cited

U.S. PATENT DOCUMENTS

| | | | |
|---|---|---|---|
| 6,454,342 B2 * | 9/2002 | Heselhaus et al. | 296/107.07 |
| 6,485,085 B1 * | 11/2002 | Pecho et al. | 296/107.07 |
| 6,536,831 B2 * | 3/2003 | Rothe et al. | 296/107.07 |
| 6,648,397 B2 * | 11/2003 | Schutt et al. | 296/107.16 |
| 6,672,638 B2 * | 1/2004 | Corder et al. | 296/24.33 |
| 6,729,672 B2 * | 5/2004 | Neubrand | 296/107.07 |
| 6,827,392 B2 * | 12/2004 | Doncov et al. | 296/147 |
| 7,303,225 B2 * | 12/2007 | Heselhaus et al. | 296/107.18 |
| 7,510,231 B2 * | 3/2009 | Lewis et al. | 296/107.07 |
| 7,744,144 B2 * | 6/2010 | Haberl et al. | 296/107.07 |
| 7,794,007 B2 * | 9/2010 | Konet et al. | 296/146.16 |
| 7,984,746 B2 * | 7/2011 | Gao et al. | 160/370.21 |
| 8,002,326 B2 * | 8/2011 | Neubrand | 296/107.07 |
| 8,205,929 B2 * | 6/2012 | Ugolini et al. | 296/107.17 |
| 2004/0046413 A1 * | 3/2004 | Willard | 296/107.07 |
| 2007/0262610 A1 * | 11/2007 | Bunsmann et al. | 296/146.16 |
| 2007/0284909 A1 * | 12/2007 | Dilluvio | 296/107.01 |

FOREIGN PATENT DOCUMENTS

| | | |
|---|---|---|
| DE | 102004004467 B4 | 9/2006 |
| DE | 102007002646 A1 | 7/2008 |
| DE | 102007008397 A1 | 8/2008 |
| EP | 1228913 B1 | 9/2007 |
| EP | 1838543 B1 | 3/2009 |
| WO | 2006072272 A1 | 7/2006 |
| WO | 2008071417 A2 | 6/2008 |

* cited by examiner

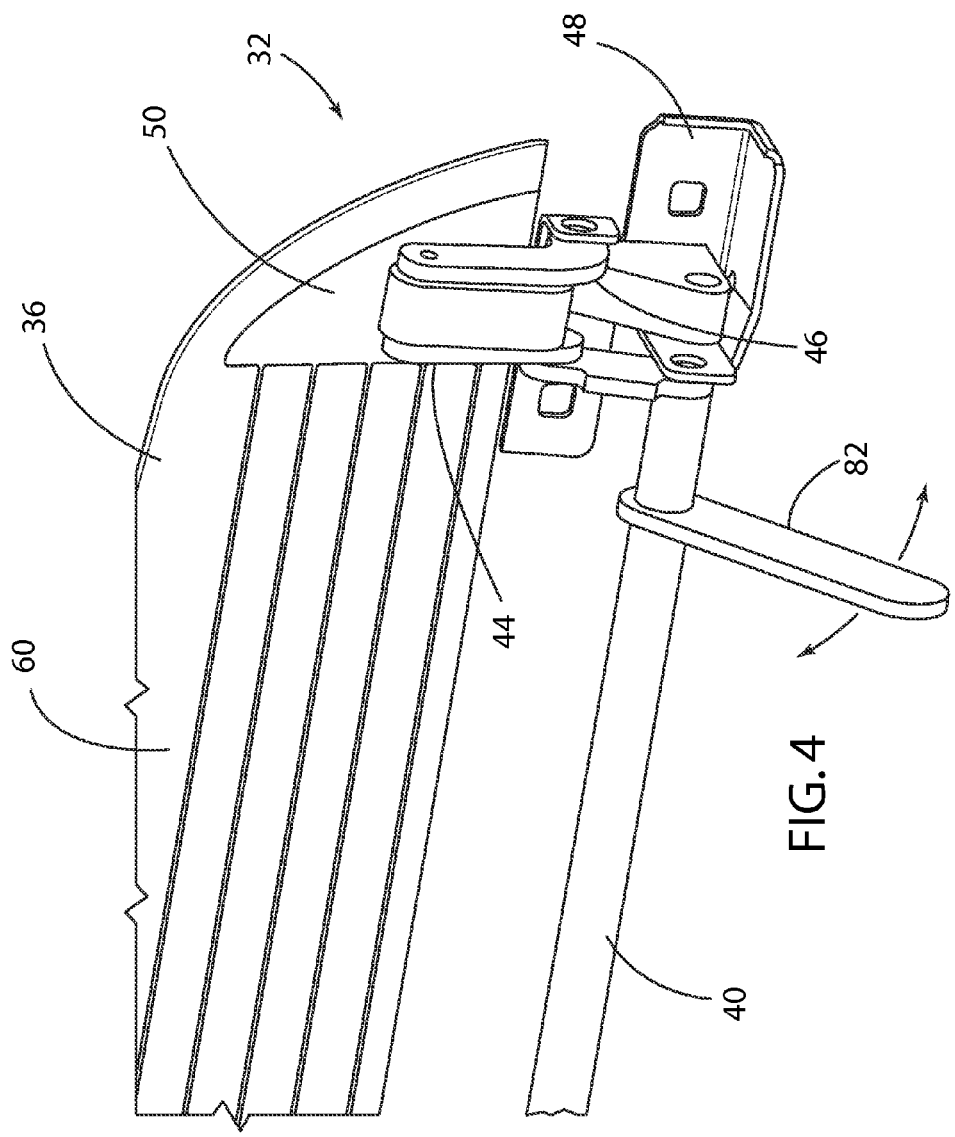

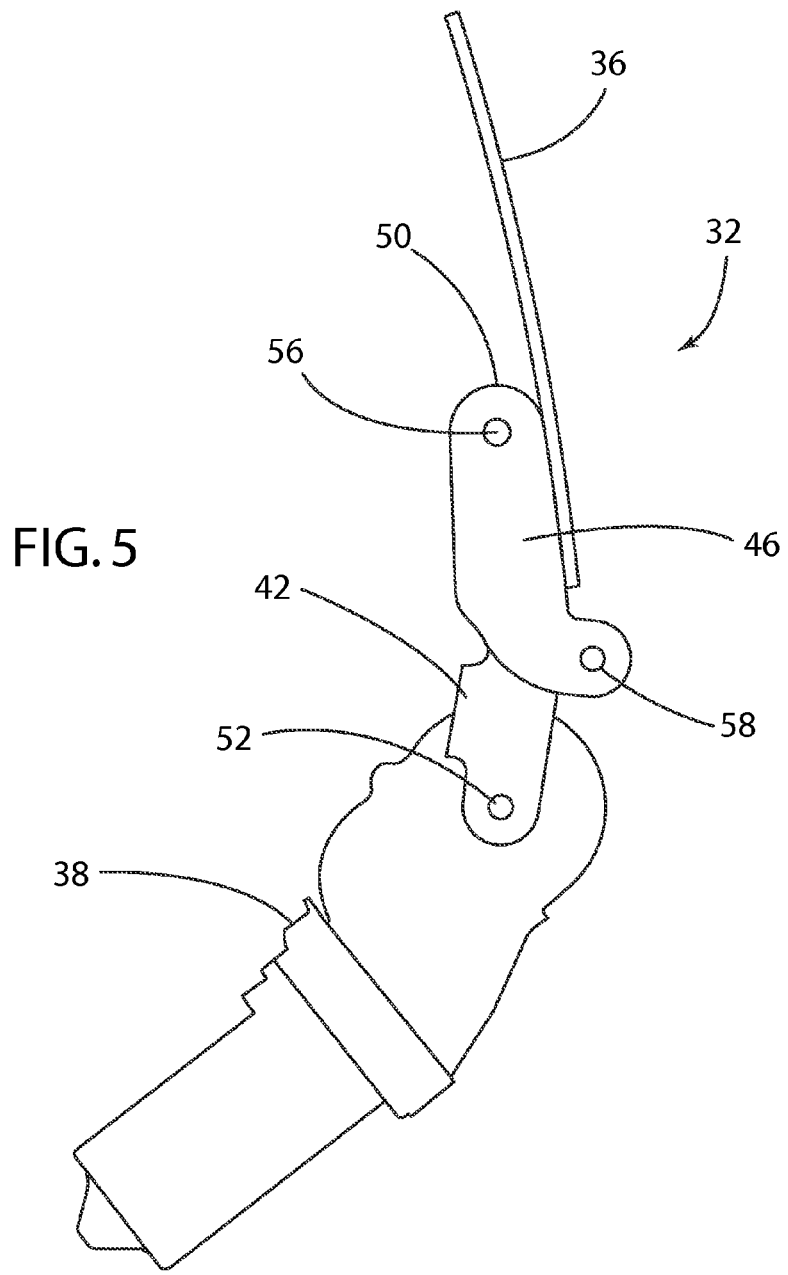

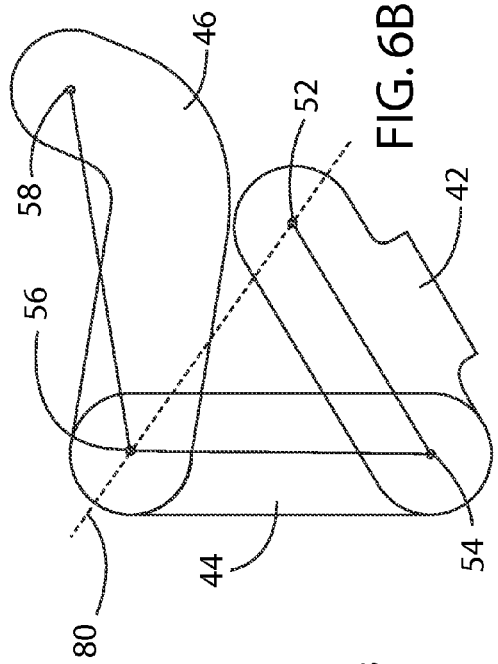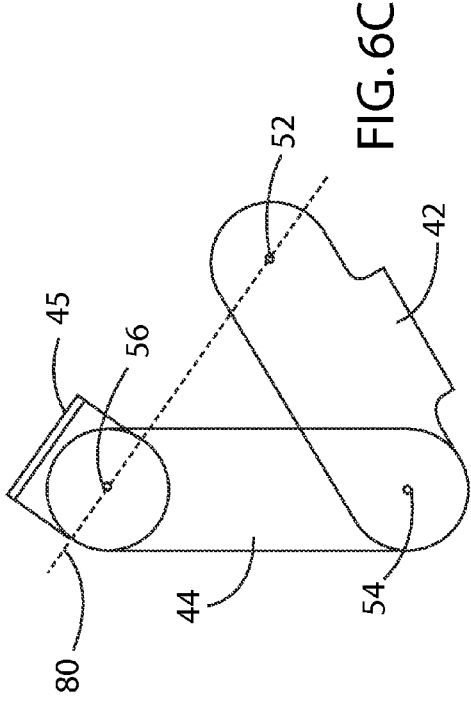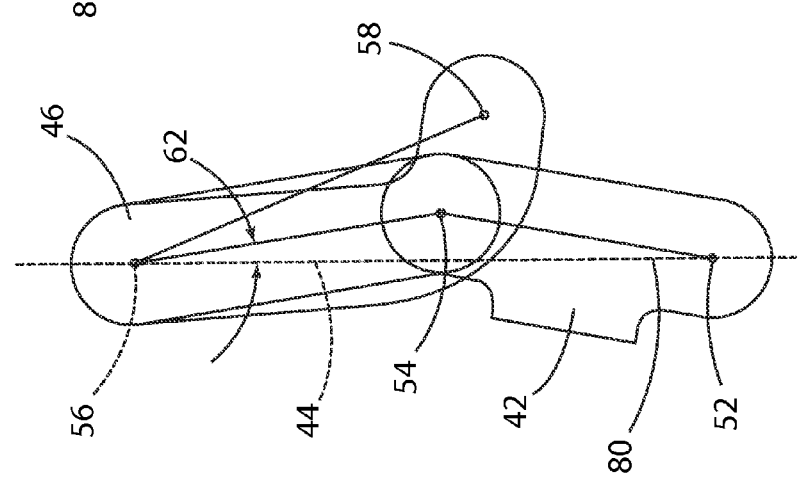

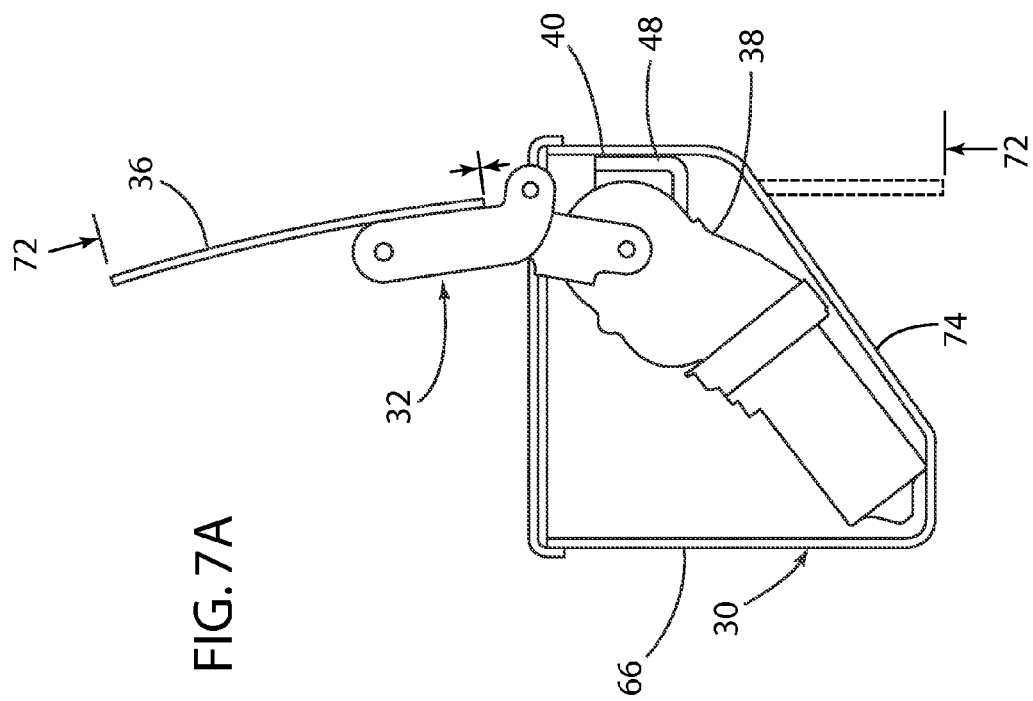

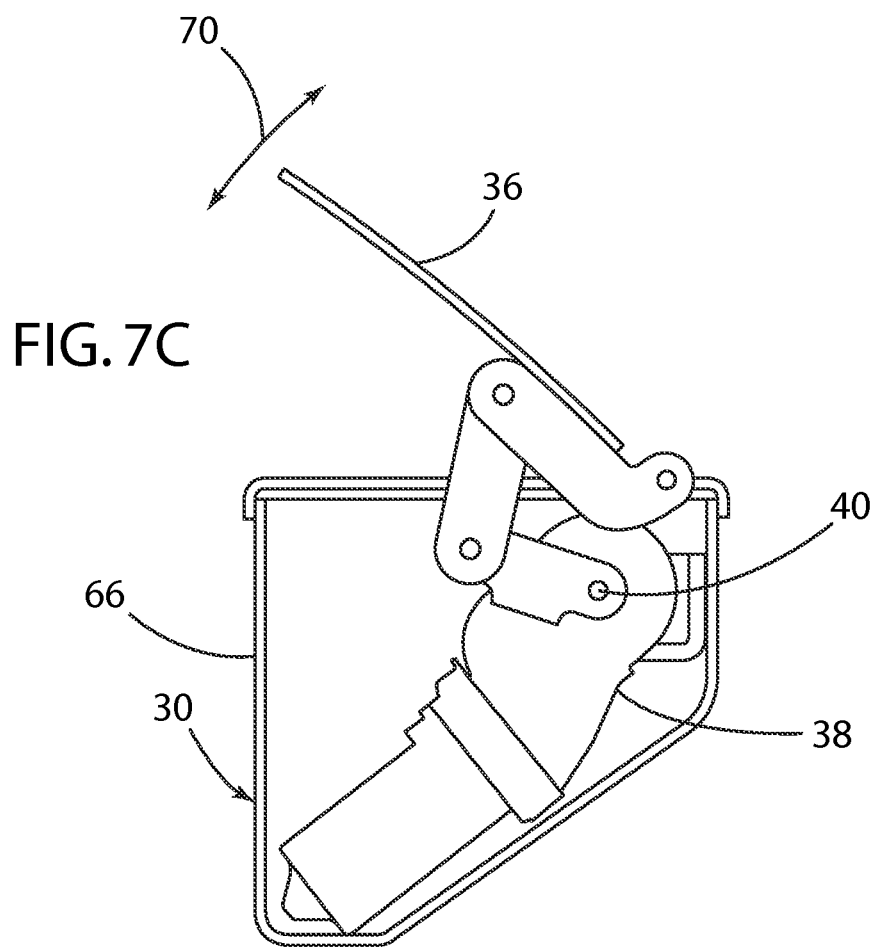

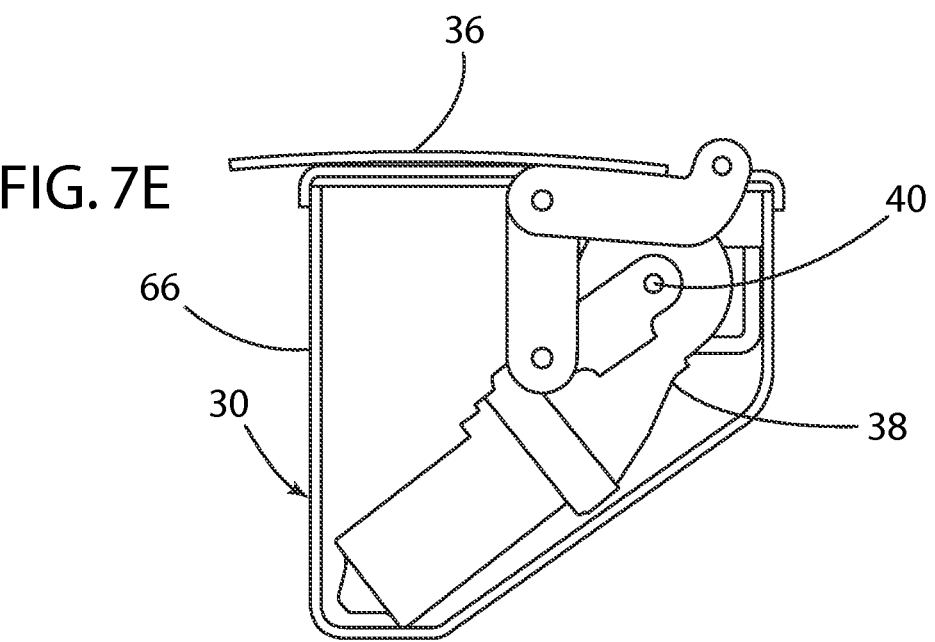

ASSEMBLIES TO ARTICULATE A VEHICLE BACKLITE

CROSS REFERENCE TO RELATED APPLICATIONS

This application claims priority from U.S. Provisional Ser. No. 61/764,271, filed on Feb. 13, 2013, which is hereby incorporated in its entirety for all purposes by reference. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

FIELD

Described herein are assemblies to articulate a movable surface, and particularly to assemblies to articulate a movable surface covering an opening of a vehicle from closed to open positions using a pivoting armature.

BACKGROUND

Movable surfaces to cover an opening of a vehicle are known in the art. Commonly known vehicle movable surfaces can include sunroofs and moon roofs for a vehicle roof. Also, the side panels of the vehicle, including the vehicle's doors, can also have movable windows. In these instances, the movable surfaces are typically pushed and pulled to an open and closed position. The pulling and pushing to actuate the opening and closing of these surfaces can include various mechanisms, controllers and motive forces, such as electric motors. Guides and storage compartments for the retracted surface are also known.

Another potential vehicle area for a movable surface can include the vehicle's rearward facing window, which is often referred to as a backlite (these terms are used interchangeably). A retractable backlite can be especially desired in vehicles having retractable roofs (e.g., convertibles, both hard and soft topped). In the past, the backlite of a soft top convertible was often flexible and moved with fabric of the top as it was extended (closed) or retracted (opened). However, it is desirable for the rear window of the vehicle to be rigid using, for example, glass or plastic. In the case of a vehicle with a retractable roof, rigid rear windows are often not easily integrated into the convertible system. There is a concern that the window can be damaged during the opening and closing of the top.

One solution to this concern can be found in a vehicle where the backlite can retract by being lowered into the vehicle body. The movement of a backlite in this instance can be through the use of a kinematic mechanism to slide the backlite vertically down into the vehicle body through a guiderail. Such a system is described in, for example, U.S. Pat. No. 6,871,899 to Mandl et al., which is incorporated in its entirety herein. In Mandl, a rear window is retracted into the vehicle compartment by a push and pull mechanism. The rear window is held on a housing, which is fixed in turn on the main bearing unit of the retractable top, so that the housing is connected in its entirety to the vehicle by being fixed on the bodywork. The rear window can be raised and lowered relative to the housing by means of a guide rail provided on the housing and a cable drive. A rear window frame has groove-like recesses which grip around the rear window to seal the vehicle opening. It is noted though that this type of mechanism to retract a backlite can be independent of the convertible system and can even be configured in vehicles with a fixed roof.

Despite these advances in the art, further advances are possible and desirable.

SUMMARY

Described herein are assemblies to articulate a movable surface, and particularly to assemblies to articulate a movable surface covering an opening of a vehicle from closed to open positions using a pivoting armature.

In one embodiment, a vehicle backlite assembly for a vehicle movable between an open position and a closed position includes a backlite pane pivotably attached about an axis fixed with respect to the vehicle; at least one lever assembly pivotably connected to the backlite pane to permit articulating movement of the backlite pane; and a motive force connected to a driveshaft, the driveshaft connected to the at least one lever assembly. Rotation of the driveshaft in response to the motive force causes movement of the at least one lever assembly and articulation of the backlite pane, the at least one lever assembly pivotably connected to the backlite pane. The motive force can be an electric motor, a lever manually actuatable by a user, a cable drive assembly connected to an electric motor, or combinations thereof.

In one approach, the at least one lever assembly is a three bar assembly, which can be configured to lock the backlite pane in a closed position by being over-centered in the closed position. The three bar assembly may include a first lever arm engaged at a first end to the driveshaft and at a second end to a first end of a second lever arm, the second lever arm having a second end that engages a first end of a third lever arm, the third lever arm having a second end that engages the backlite pane. The three bar assembly can be over-centered in the range of about 0.01 to 15 degrees, and preferably, can be over-centered about 10 degrees. In one approach, the backlite assembly can optionally have a plastically deformable backlite seal to allow displacement as the pivot assembly crosses over a centerline, while also providing a weather tight seal in its final over-center position.

In another approach, the backlite assembly can have an optional housing to house at least the driveshaft and the motive force. A user-activated controller to actuate the backlite pane between an open position and a closed position can also be added.

In another approach, the at least one lever assembly can be pivotably connected to the backlite pane by a mounting bracket mounted to the backlite pane at or about midway along the backlite pane height.

In one approach, the at least one lever assembly is a two bar assembly. The two bar assembly may include a first lever arm engaged to the driveshaft and a second lever arm engaged to the backlite pane. The second lever arm may be engaged to the backlite pane at a predetermined distance away from the axis about which the backlite pane pivots. In one approach, the second lever arm is engaged to the backlite pane. In another approach, the second lever arm is engaged to an intermediary mount and the intermediary mount is engaged to the backlite pane.

In another approach, a vehicle is provided including a backlite assembly movable between an open position and a closed position, including: a backlite pane pivotably attached about an axis fixed with respect to the vehicle; at least one lever assembly pivotably connected to the backlite pane to permit articulating movement of the backlite pane; and a motive force connected to a driveshaft, the driveshaft connected to the at least one lever assembly such that rotation of the driveshaft in response to the motive force causes movement of the at least one lever assembly and articulation of the backlite pane, the at least one lever assembly pivotably connected to the backlite pane.

In another approach, a method of moving a backlite assembly for a vehicle between an open position and a closed position is provided comprising the steps of pivotably attaching a backlite pane about an axis fixed with respect to the vehicle; providing at least one lever assembly pivotably connected to the backlite pane; providing a motive force connected to a driveshaft connected to the at least one level assembly; and articulating the backlite pane using via movement of the at least one level assembly moving in response to rotation of the driveshaft caused by the motive force at least one lever assembly, the at least one lever assembly pivotably connected to the backlite pane.

Numerous other advantages and features of the present disclosure will be become readily apparent from the following detailed description and the embodiments therein, from the claims and from the accompanying drawings.

BRIEF DESCRIPTION OF THE DRAWINGS

FIG. 4 is front perspective close-up view of an articulating backlite armature assembly of the present embodiments in a deployed position;

FIG. 5 is a side view of an articulating backlite assembly of the present embodiments in a deployed position;

FIGS. 6A and 6B are side schematic views of the armature assembly of FIG. 5 of an articulating backlite assembly of the present embodiments in a stowed position (6A) and deployed position (6B);

FIG. 6C is a side schematic view of an armature assembly of an articulating backlite assembly according to an embodiment of FIG. 11, shown in a position intermediate to the deployed and stowed positions;

FIGS. 7A-7E represent a series of side views of the articulating backlite assembly module of the present embodiment of FIGS. 1 and 3 progressing from an deployed position (FIG. 7A) to a stowed position (FIG. 7E);

DETAILED DESCRIPTION

Figure 1A:
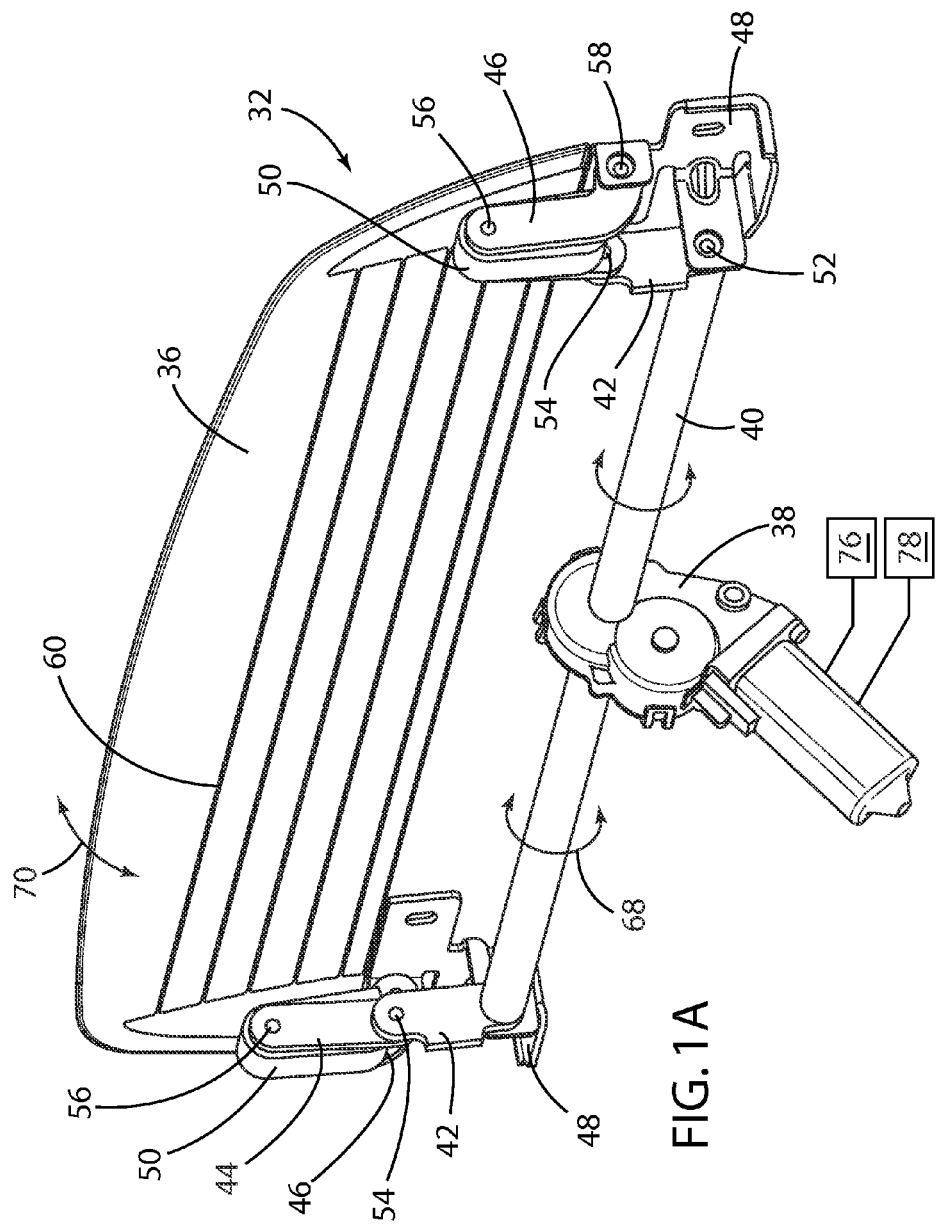
FIG. 1A-C are front perspective views (i.e., facing rearward relative to the front of the vehicle) of an articulating backlite assembly of the present embodiments progressing from a deployed position (FIG. 1A) to a stowed position (FIG. 1C)
Figure 1B:
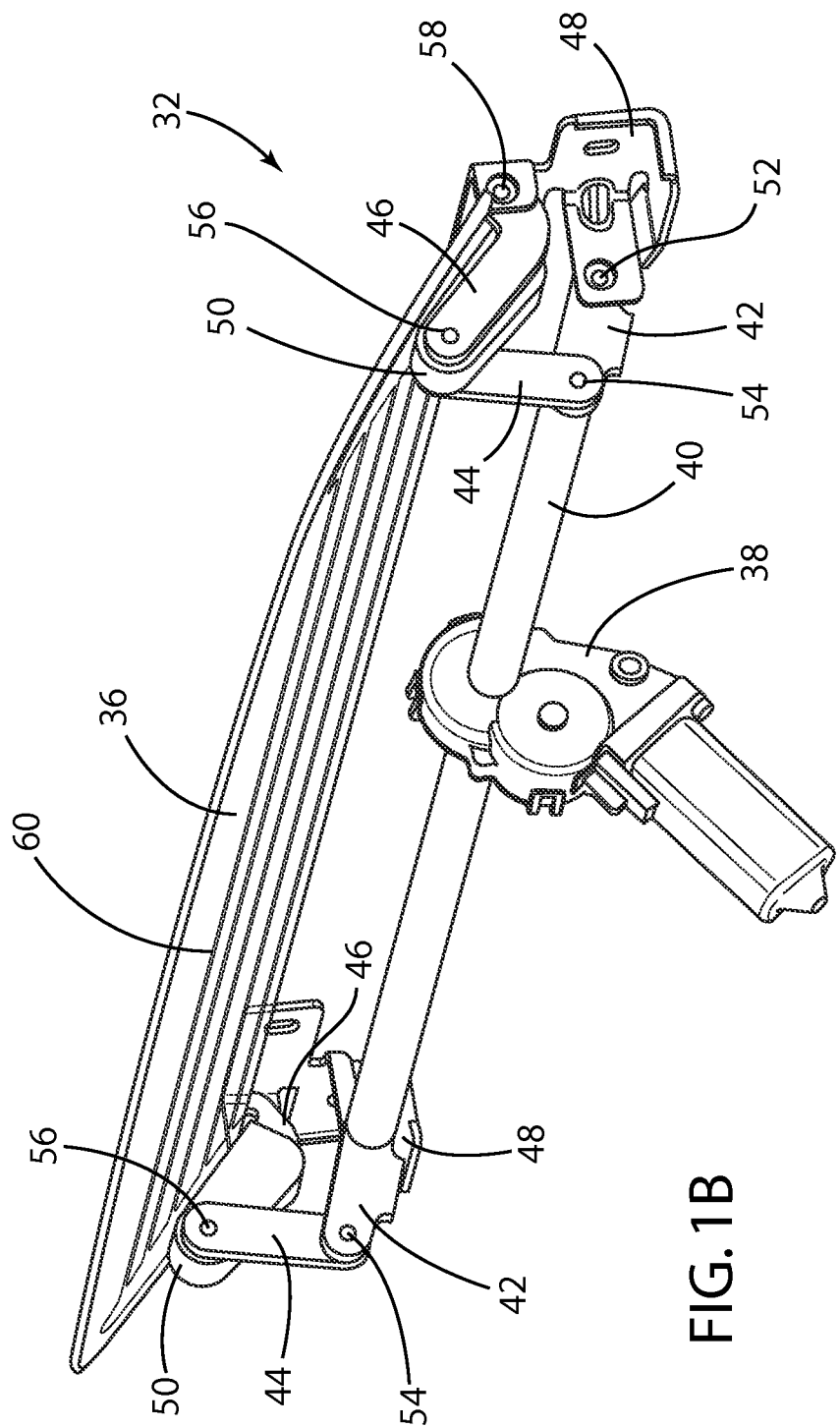
Figure 1C:
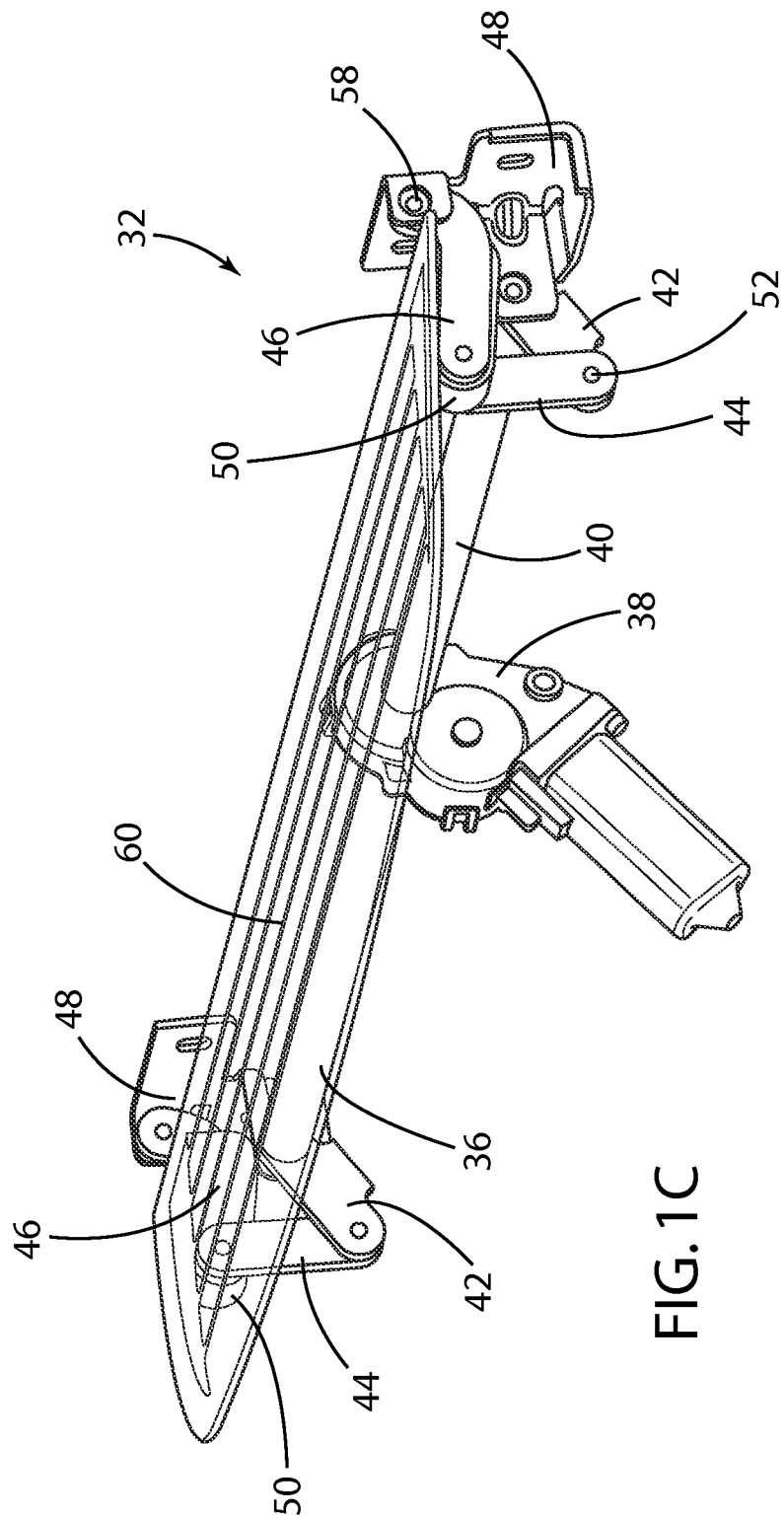

Described herein are assemblies to articulate a movable surface, and particularly to assemblies to articulate a movable surface covering an opening of a vehicle from closed to open positions using a pivoting armature. In preferred embodiments, the articulated surface is movable solely using a pivoting armature. The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present controllers and methods. Thus, appearances of the phrases "in one embodiment," "in an embodiment," "in some embodiments," and similar language throughout this specification may, but do not necessarily, all refer to the same embodiment.

Pursuant to the various embodiments described herein, assemblies and modules to deploy a movable surface are provided. Particularly the present embodiments relate to assemblies to repeatedly articulate a movable surface to open and close a surface opening using a pivoting lever armature and all points in-between. It is noted that while the present disclosure describes modules and assemblies with an emphasis on a vehicle's rearward window (backlite), the present embodiments may also be applied to any surface having an opening and any movable surface intended to open (expose) and close (cover) the opening.

For embodiments of vehicle surface openings, the scope of the present embodiments may include any vehicle types, such as automobiles, trucks, trains, boats, busses, and the like. Further, the present embodiments may be applied to any movable surface, such as a backlite, and may be comprised of a variety of materials, including but not limited to, glass, polymers, metals, woods, rubbers, composites, combinations thereof, and the like. The present embodiments may also be configured for use on vehicles having convertible roof systems having either hard or soft tops.

As noted above, it is known in the art that the movement of a backlite from a closed position to an open (lowered, stowed) position may be through vertical, or near vertical, sliding kinematics to lower the closed backlite vertically down into the vehicle body. The sliding kinematics for the backlite can be independent or integrated as part of an overall roof retraction assembly for convertibles. Frequently, these mechanisms, including guide members and drive motors, can be bulky, and are often physically situated directly beneath the backlite to a depth of the height of the backlite. These mechanisms can restrict functionality of the backlite as well as the retraction or extension of the roof. Further, if other structures are desired in a vehicle beneath the backlite, such options would be limited. One other consideration is that retraction of the backlite into the vehicle body could affect structural integrity of a vehicle since the area to allow passage of the backlite pane may traverse through the vehicle body. This would be particularly undesirable in vehicle bodies made from carbon fiber.

Another known disadvantage in vehicles having a backlite panel sliding down into the vehicle body is that the compartment below the backlite would likely accumulate debris. In an attempt to minimize the impact of this compartment beneath the backlite pane, the compartment is typically angled to generally follow the angle (rake) of the passenger seat adjacent this compartment. This often can require the backlite pane to follow this same "negative" angle in its extended (closed) position. This negative angle can cause an undesired lift of the portion of the vehicle aft of the backlite pane. In a high performance vehicle, this impact can be significant.

The present embodiments address these concerns. To assist in understanding the present embodiments, an articulating vehicle backlite is illustrated. As generally shown in the figures, the backlite having the assemblies of the present embodiments can be articulated from an open (stowed) to a closed (deployed) position, as well as all intermediate positions as the backlite's travel progresses from the closed (deployed) position to the open (stowed) position. The present embodiments provide mechanisms having pivotal armatures and thus do not require the space directly beneath the backlite to house the stowed backlite as needed when sliding mechanisms are utilized. Accordingly, the present embodiments provide a movable backlite which solves the above noted concerns of space restrictions within a vehicle. Additionally, the present embodiments eliminate the sliding motion of a glass drop-style backlite module known in the art, such as for convertible applications. The present embodiments allow greater flexibility in vehicle architecture by allowing use of space directly under the backlite. The simplification of the present mechanisms further allows for easier service access to the backlite, such as to repair or replace the backlite. The present embodiments may be used independently of a movable roof mechanism such as a convertible top (both soft and hard tops).

Turing now to the figures, an exemplary mechanism of the present embodiments is illustrated in FIGS. 1-8 to provide an understanding of an assembly according to one approach. For example, FIG. 1A-C are front perspective views (i.e., facing rearward relative to the front of the vehicle) of an articulating backlite assembly 32 of the present embodiments progressing from a deployed position (FIG. 1A) to a stowed position (FIG. 1C). FIG. 4 illustrates a front perspective close-up view of an articulating backlite armature assembly 32 according to one embodiment in a deployed position with an optional mechanical lever 82.

Figure 2:
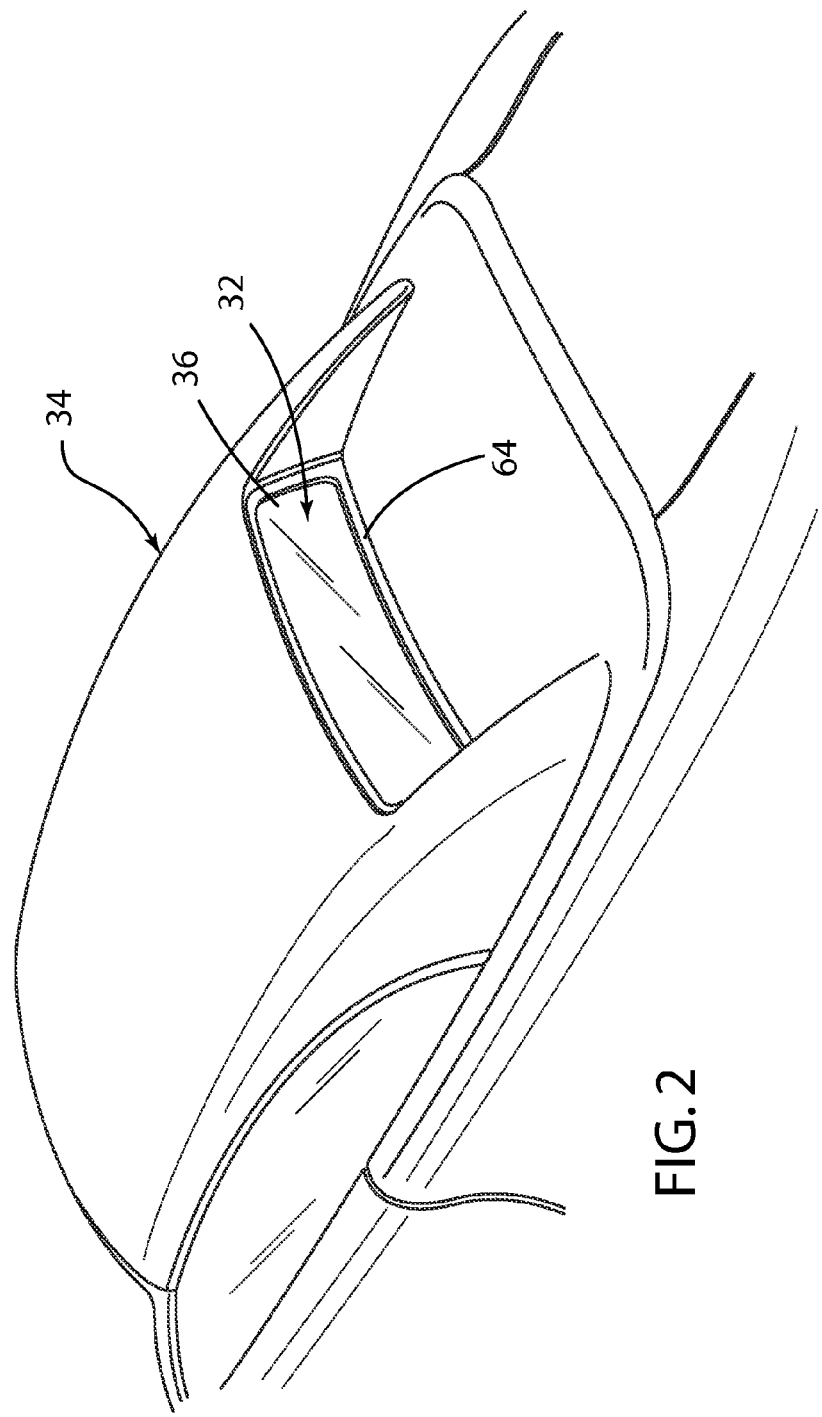
FIG. 2 is a rear prospective view of a vehicle (facing forward) having an articulating backlite assembly of the present embodiments in a deployed position.
Figure 3:
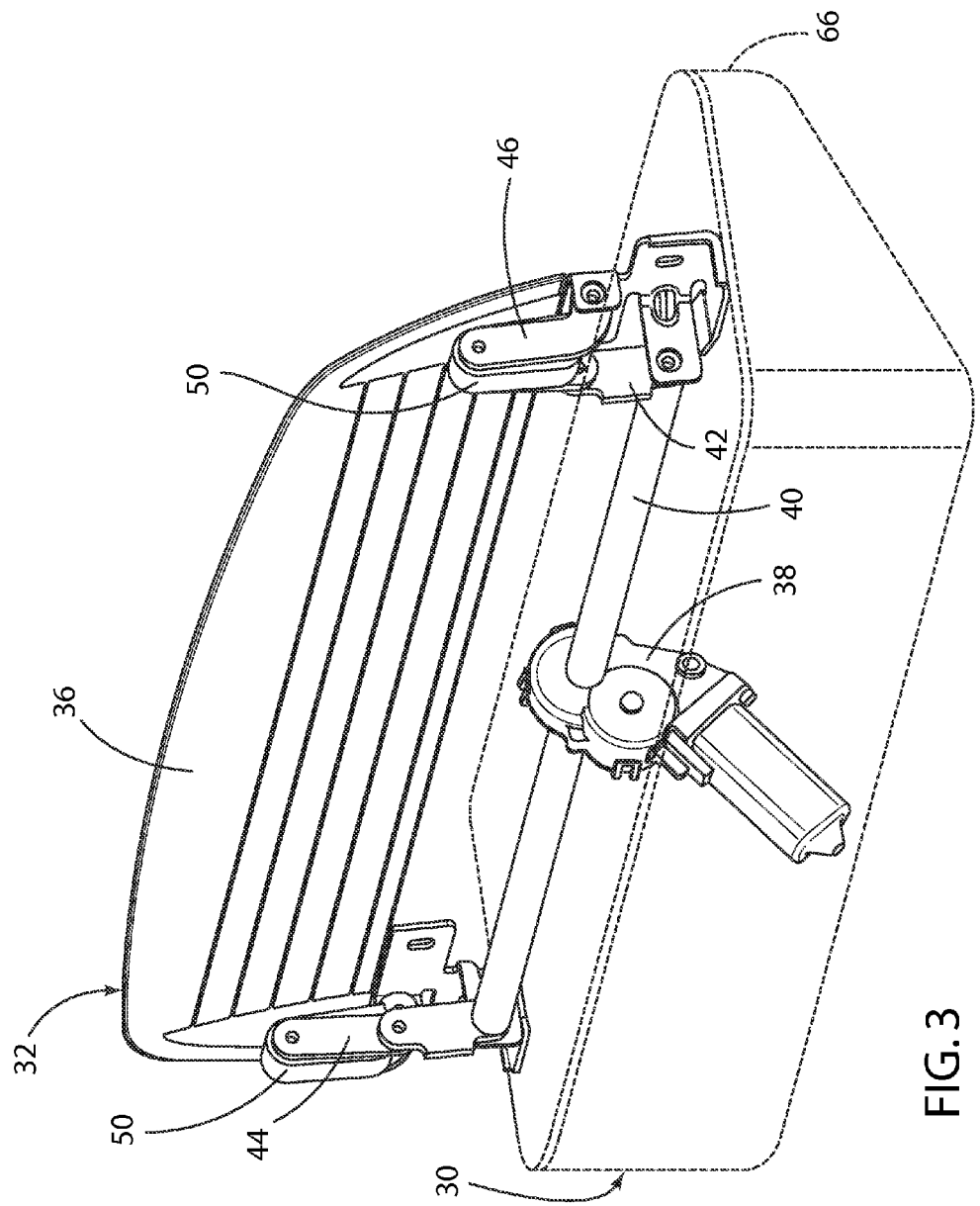
FIG. 3 is front perspective view of an articulating backlite assembly module of the present embodiments in a deployed position.
Figure 7B:
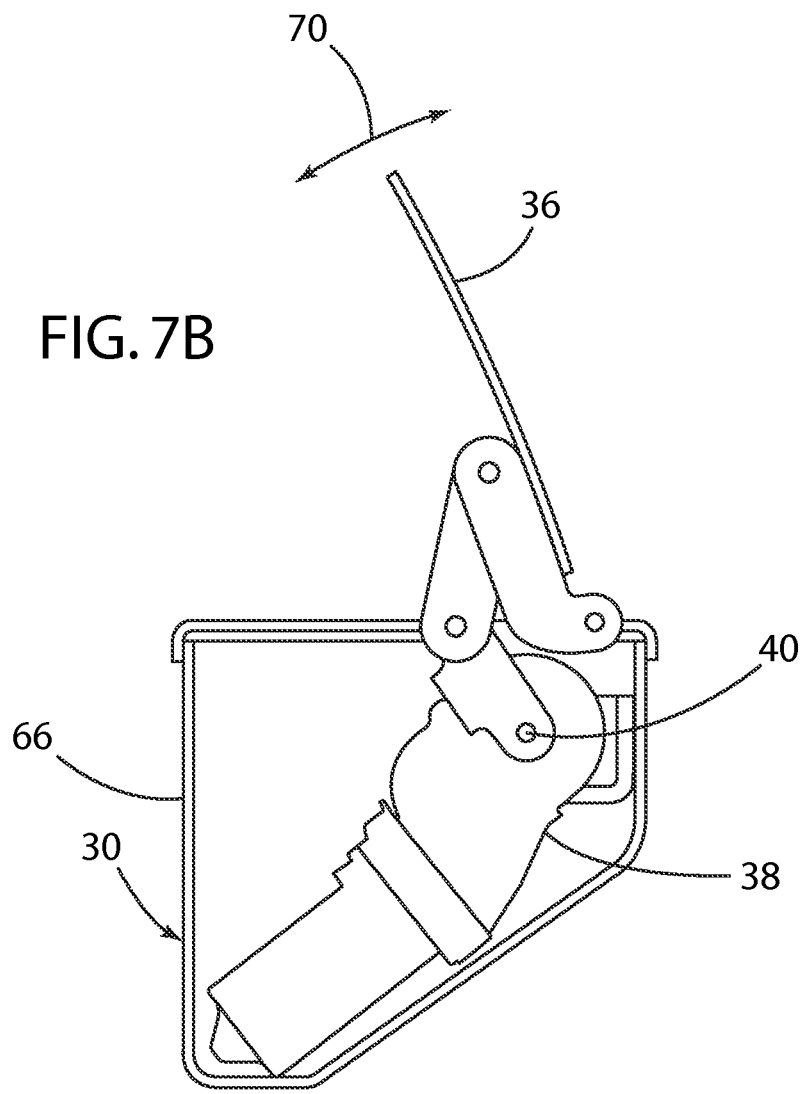
Figure 7D:
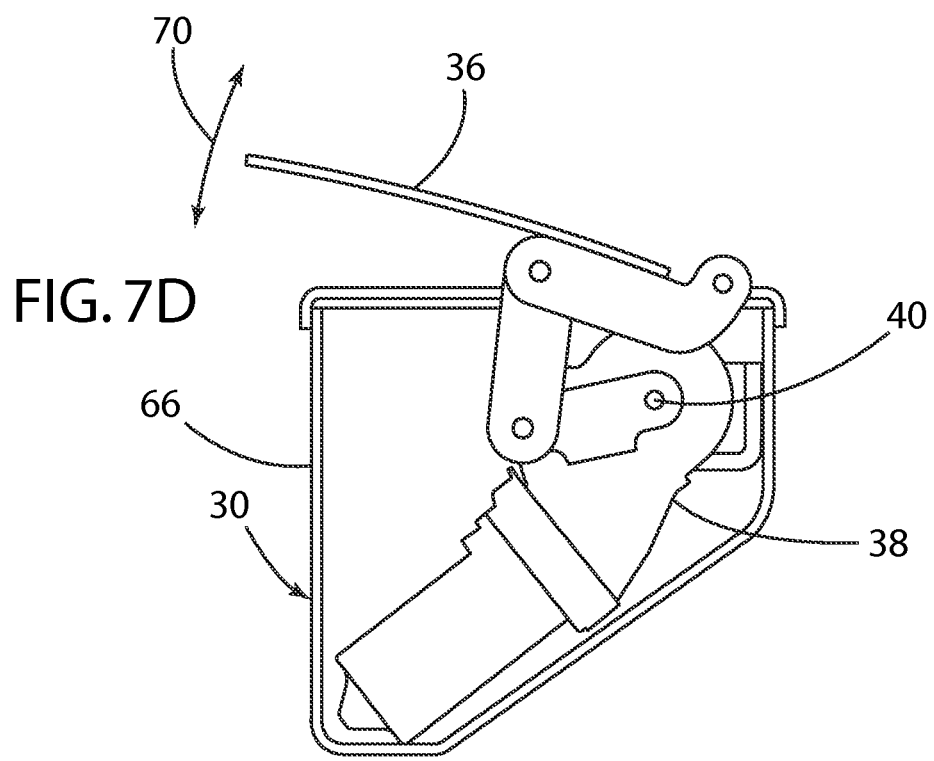
Figure 8A:
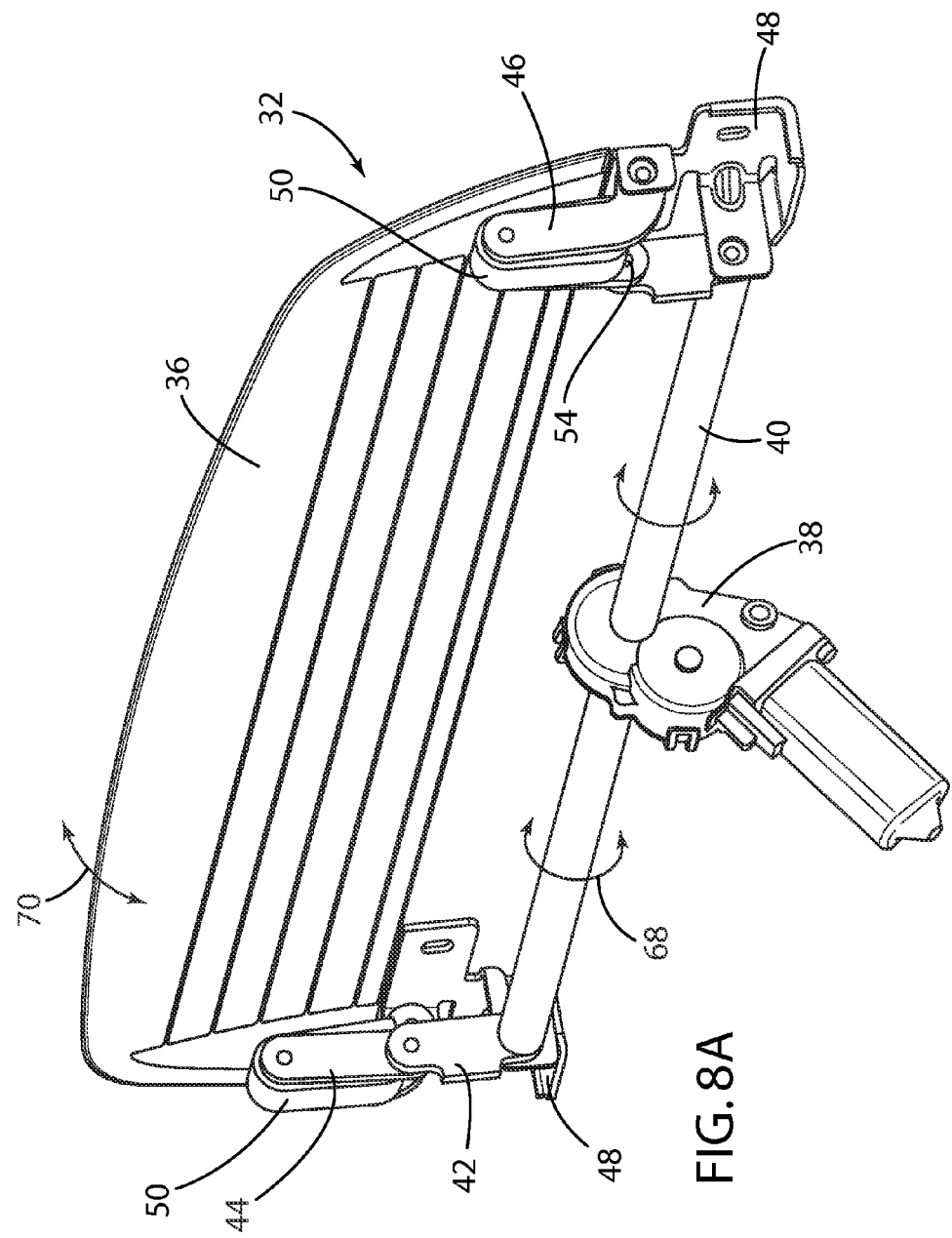
FIGS. 8A-8F represent a series of perspective front views of the articulating backlite assembly of the present embodiment of FIG. 1 progressing from a deployed position (FIG. 8A) to a stowed position (FIG. 8F)
Figure 8B:
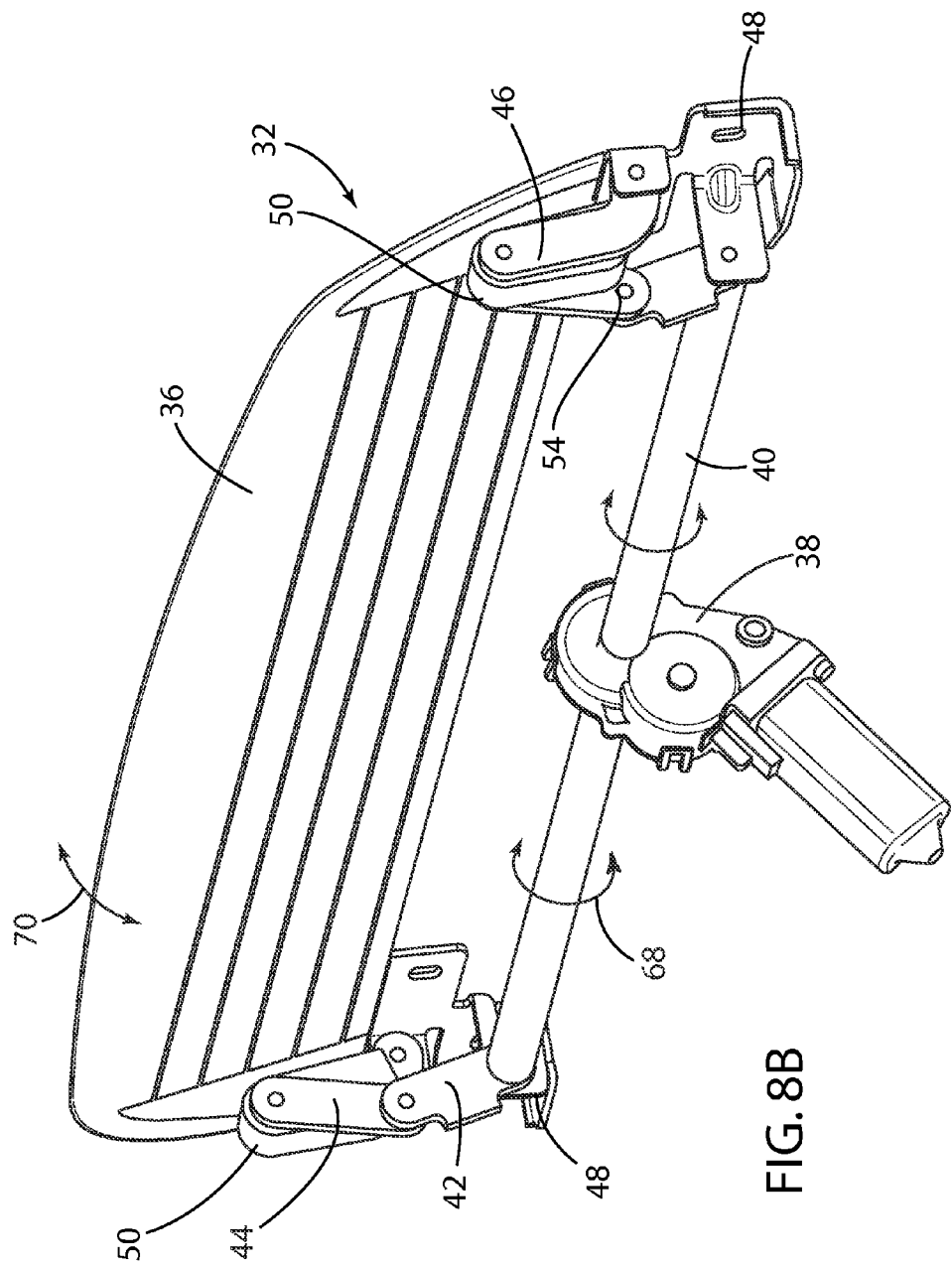
Figure 8C:
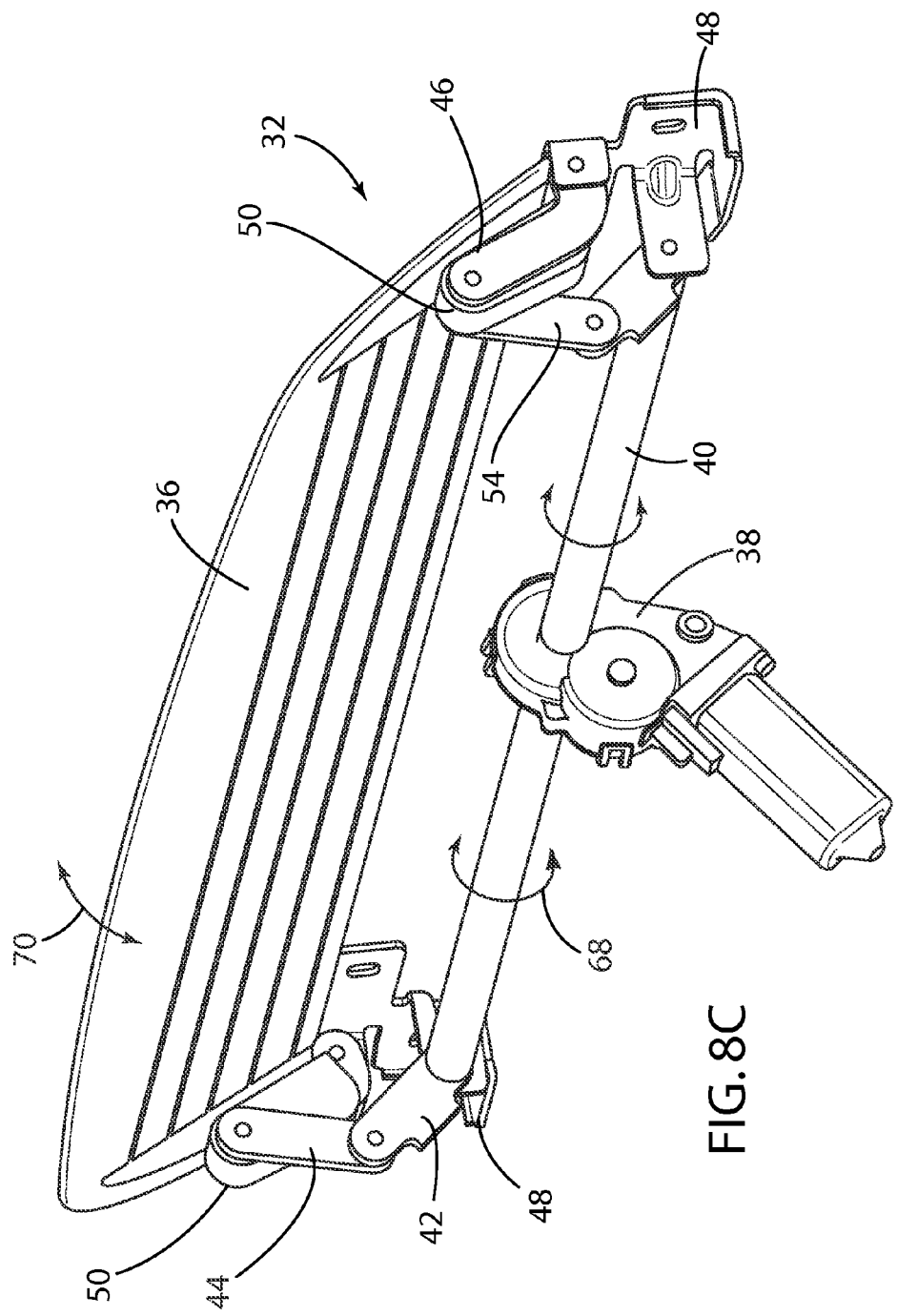
Figure 8D:
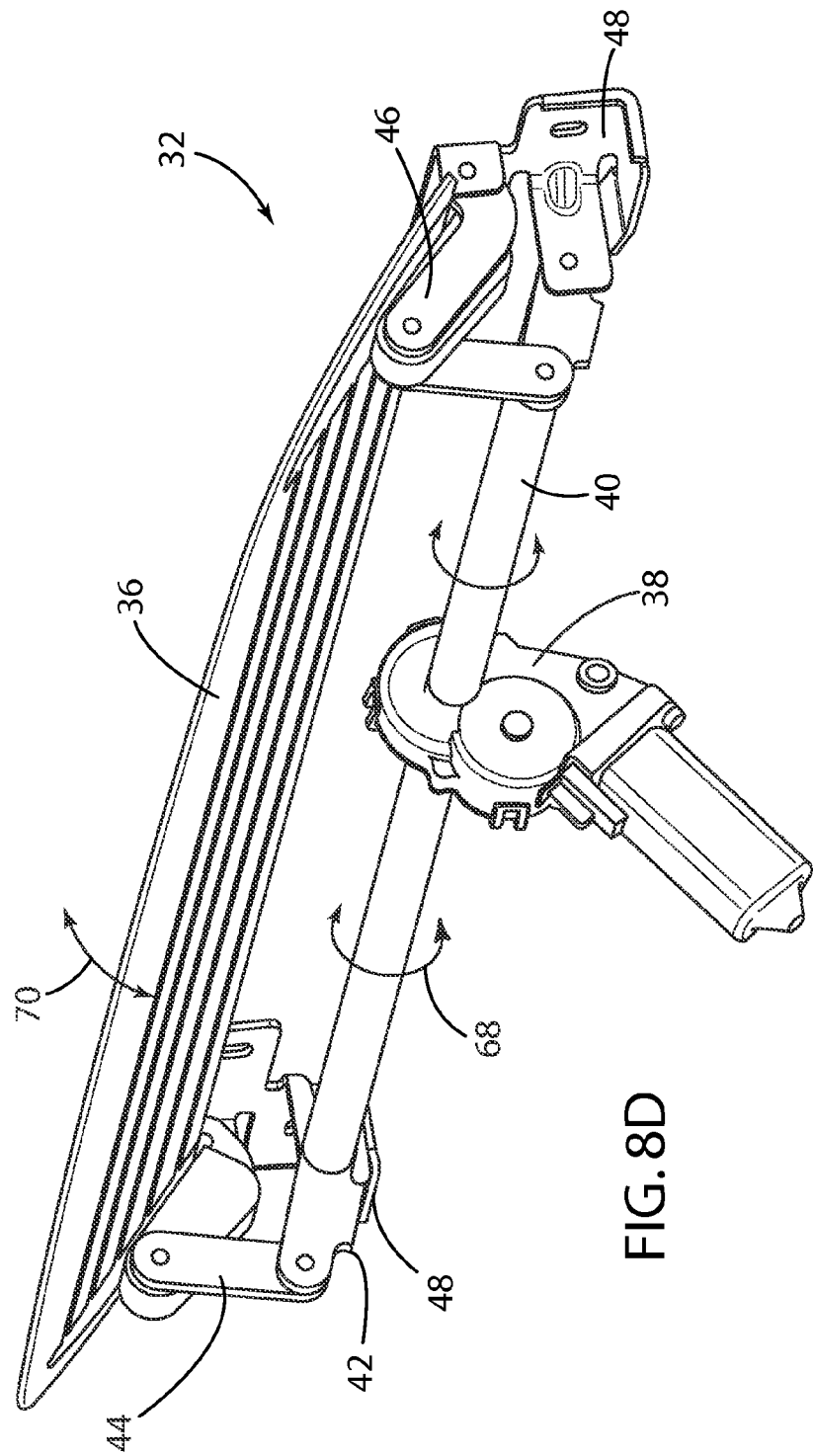
Figure 8E:
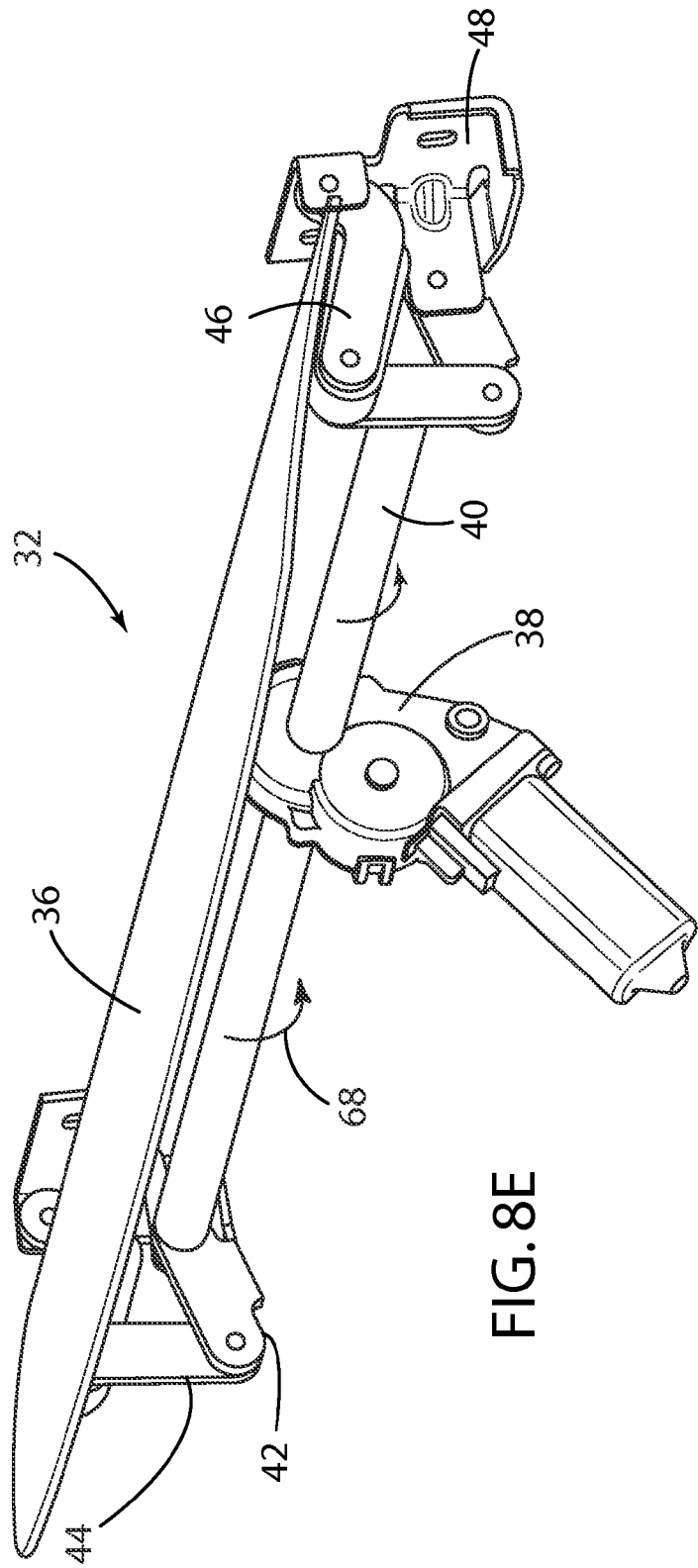
Figure 8F:
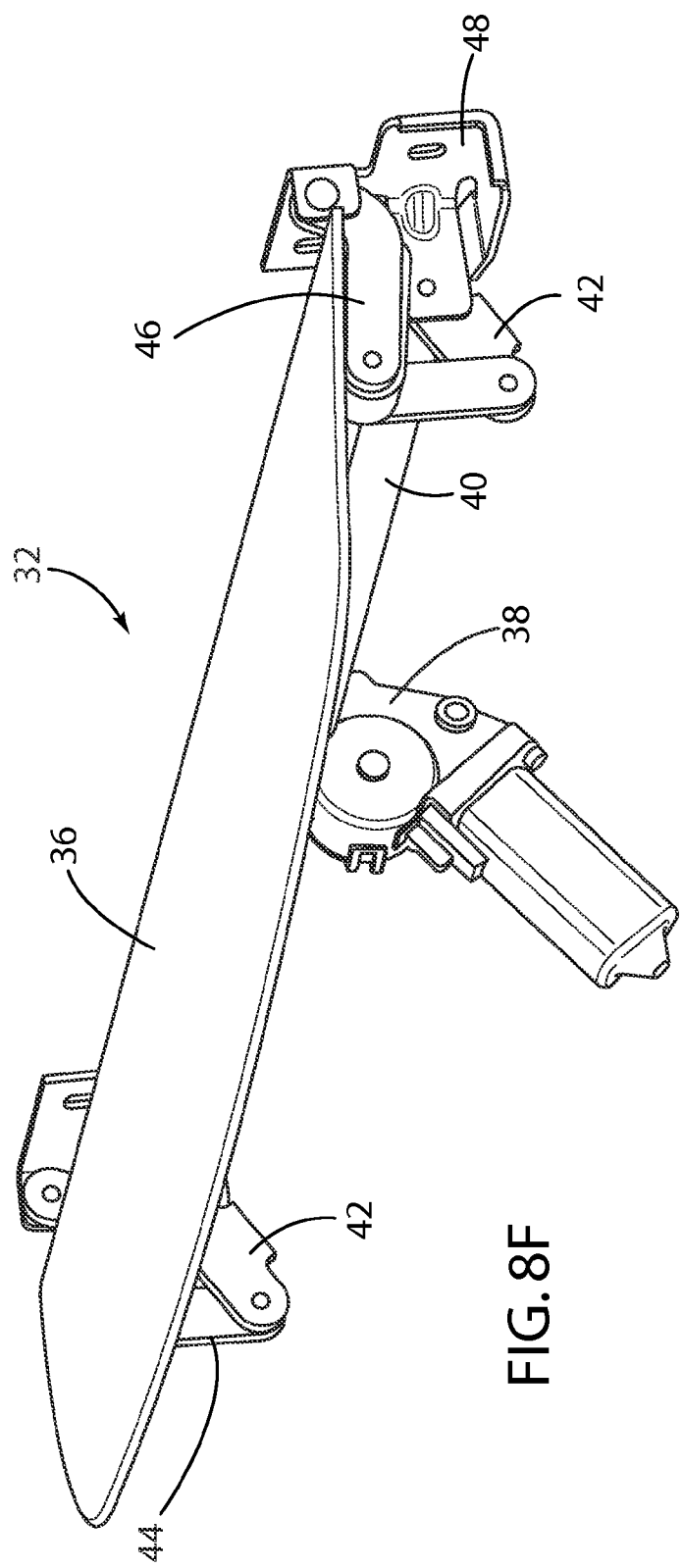

As shown, an articulating backlite assembly 32 can be oriented in a vehicle 34, such as shown in FIG. 2. As shown in FIG. 2, only a backlite pane (backlite) 36 and a backlite seal 64 defining an opening of the vehicle 34 are visible. In the illustrated approach, the backlite 36 is shown articulating toward the interior of the vehicle 34 to create an opening. It is noted though that in some embodiments, backlite 36 may articulate outward and away from the vehicle 34. It is also noted that backlite 36 may be held by the articulating backlite assembly 32 at any position along the travel 70 of the backlite 36, as shown in FIG. 1. In this instance, the backlite 36 may create a partial opening for venting of the interior of the vehicle 34. Backlite 36 may be formed of a variety of materials, but is shown in the accompanying Figures by way of example only as being made of glass. Backlite 36 can be configured to include heating elements 60 to assist in defrosting or defogging the glass as needed.

In some embodiments, articulating backlite assembly 32 can be housed in an optional module 30, such as shown in FIGS. 3 and 7A-7E. Module 30 may be configured as a cassette that allows ease of installation of the articulating backlite assembly 32. The shape and size of module 30 may be configured to fit into available space of the vehicle 34 but the module 30 preferably should not occupy the depth of the height 72 of backlite 36 (See FIG. 7A) beneath the backlite 36. As shown in 7A, panel 74 of housing 66 of module 30 is angled to not occupy this space of the vehicle 34. Module housing 66 is sized and shaped preferably to have the maximum size needed to allow articulation of the backlite pane 36. Module housing 66 may be formed of a variety of materials as desired by weight, strength and durability. In the present embodiments, module housing 66 can be form of a high strength composite, polymer, carbon fiber, combinations thereof, and the like. Articulating backlite assembly 32 can be mounted to a vehicle 34 via the module housing 66 of the module 30 by mounting brackets 48, as shown, for example, in FIG. 7A. It is again noted though that module housing 66 is optional, or may be part of the body of the vehicle 14 that is configured to receive the backlite articulating assembly 32.

Figure 9:
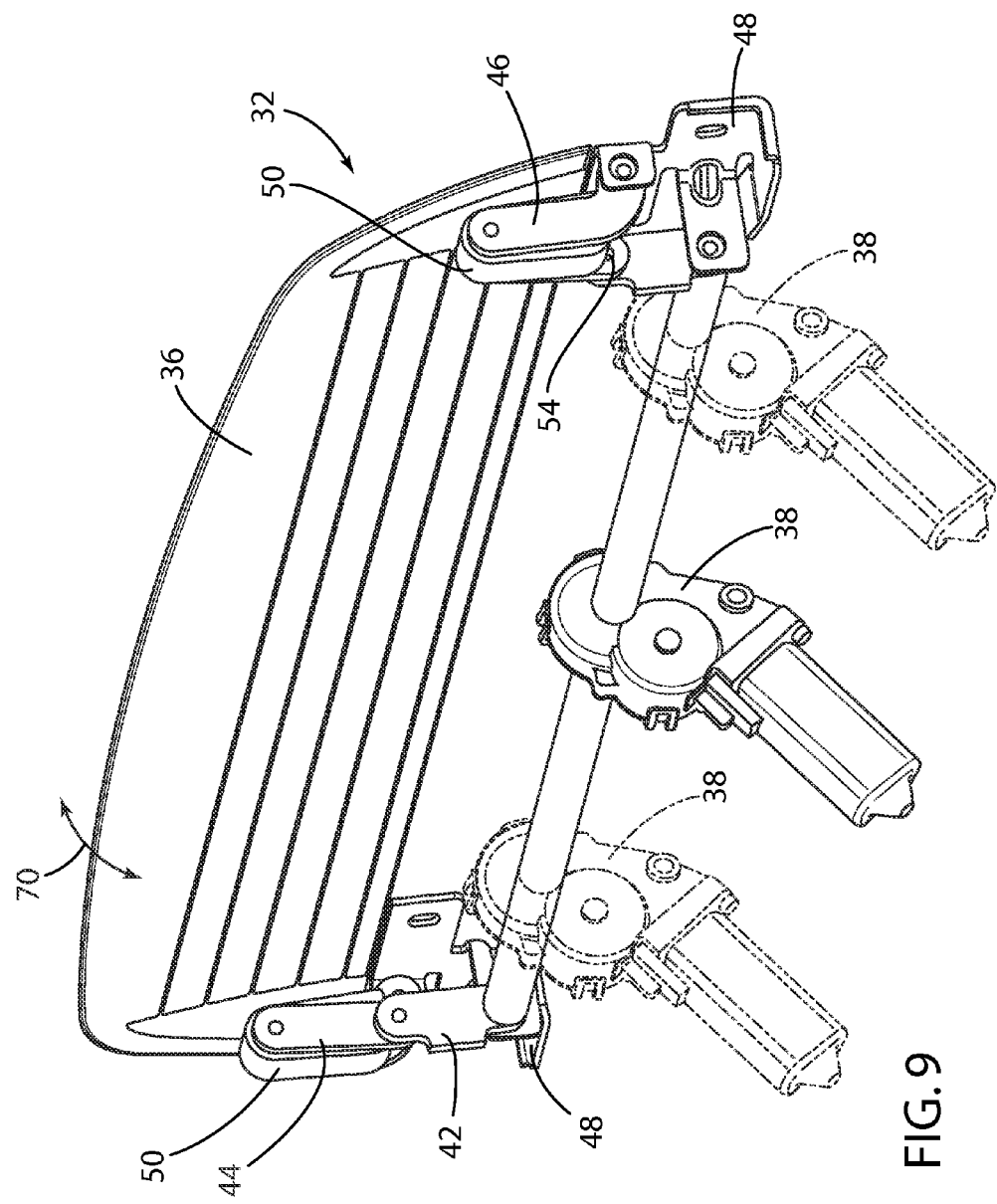
FIG. 9 is a front perspective view (i.e., facing rearward relative to the front of the vehicle) of an articulating backlite assembly of the present embodiments in a deployed position and showing alternative locations (in dotted lines) of a drive that provides a motive force to the articulating backlite assembly.
Figure 10:
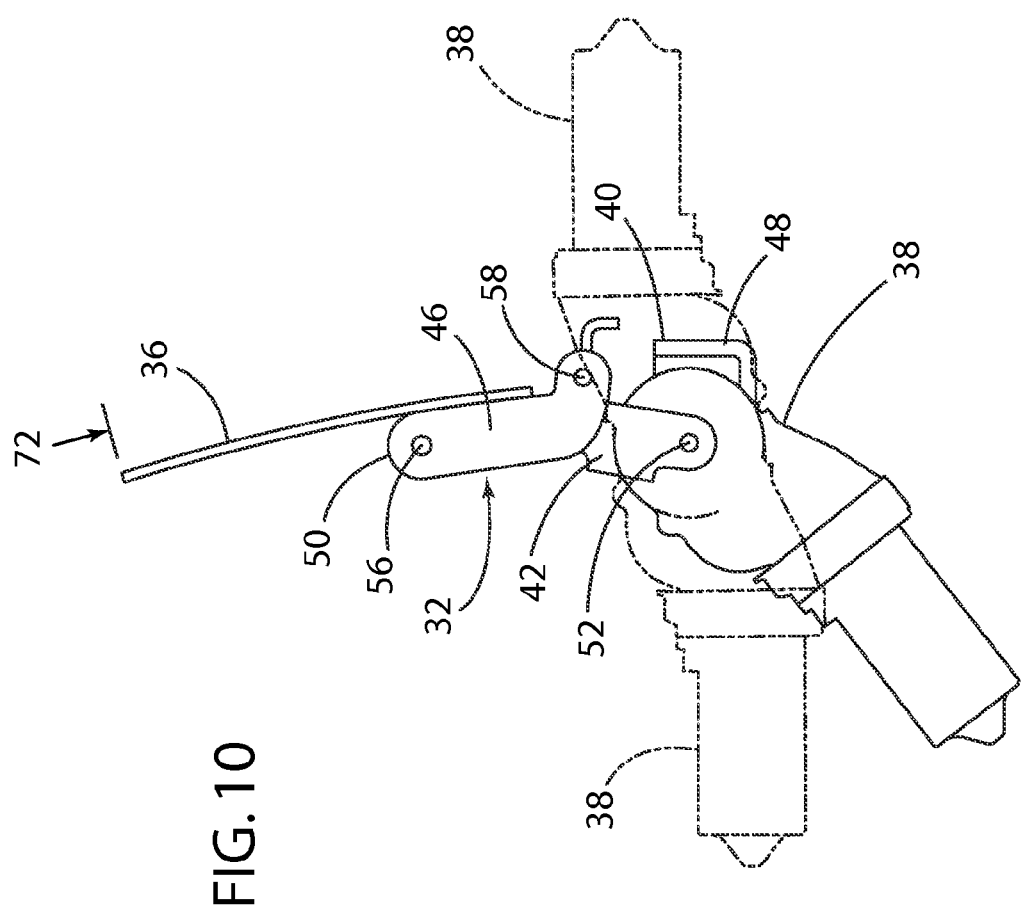
FIG. 10 is a side view of an articulating backlite assembly of the present embodiments in a deployed position and showing alternative locations (in dotted lines) of a drive that provides a motive force to the articulating backlite assembly.

Articulating backlite assembly 32 preferably includes a mechanism or structure for providing a motive force 38 to drive the articulating armature. The motive force 38 can be provided by a user actuated lever, such as lever 82 shown in FIG. 4. Other various mechanical assemblies, such as gear, crank and cable drives can also be considered for providing a rotating motive force 38 to drive the driveshaft 40. As shown in FIG. 1, the motive force 38 is provided by a drive device such as an electric motor activated by an electrical supply 76 and a controller 78. Controller 78 can actuate the motive force for driving the driveshaft 40 in response to a predetermined input to a vehicle controller, such as a toggle activated by the user, or other predetermined inputs. As shown, the motive force 38 can be configured to move the driveshaft 40 by rotation 68, as shown, for example, in FIG. 1A. Driveshaft 40 can be a spline shaft engaging a gear drive within the motive force 38. It is also noted that the motive force 38 can be positioned anywhere along the length of the driveshaft 40, with two of such possible alternative positions being shown in FIG. 9. Motive force 38 can also be positioned at any point along the rotation axis of the driveshaft 40, with two of such possible alternative positions being shown in FIG. 10.

As shown, the position of motive force 38 is centered to address vehicle balance concerns. Further, multiple motive forces 38 can be placed along drive shaft 40. Also, there may be multiple driveshafts 40 to actuate the armature on either side of backlite 36.

As illustrated, rotation 68 of driveshaft 40 articulates backlite 36 along a travel path 70 shown in the progressive sequences of FIGS. 1A-1C, 7A-7E and 8A-8F. This articulation is the result of an armature assembly having multiple lever arms (bars) and pivot points. The illustrated exemplary armature assembly uses three lever arms and four pivot points (i.e., a three bar assembly), as shown in FIGS. 6A and 6B and discussed in more detail below. It is noted that many alternative configurations of lever arms and pivot points are possible to achieve a desired articulation packaging size. Variations in the number of lever arms, number of pivot points, and distancing and positioning of the pivot points are possible within the scope of the present embodiments.

Figure 11:
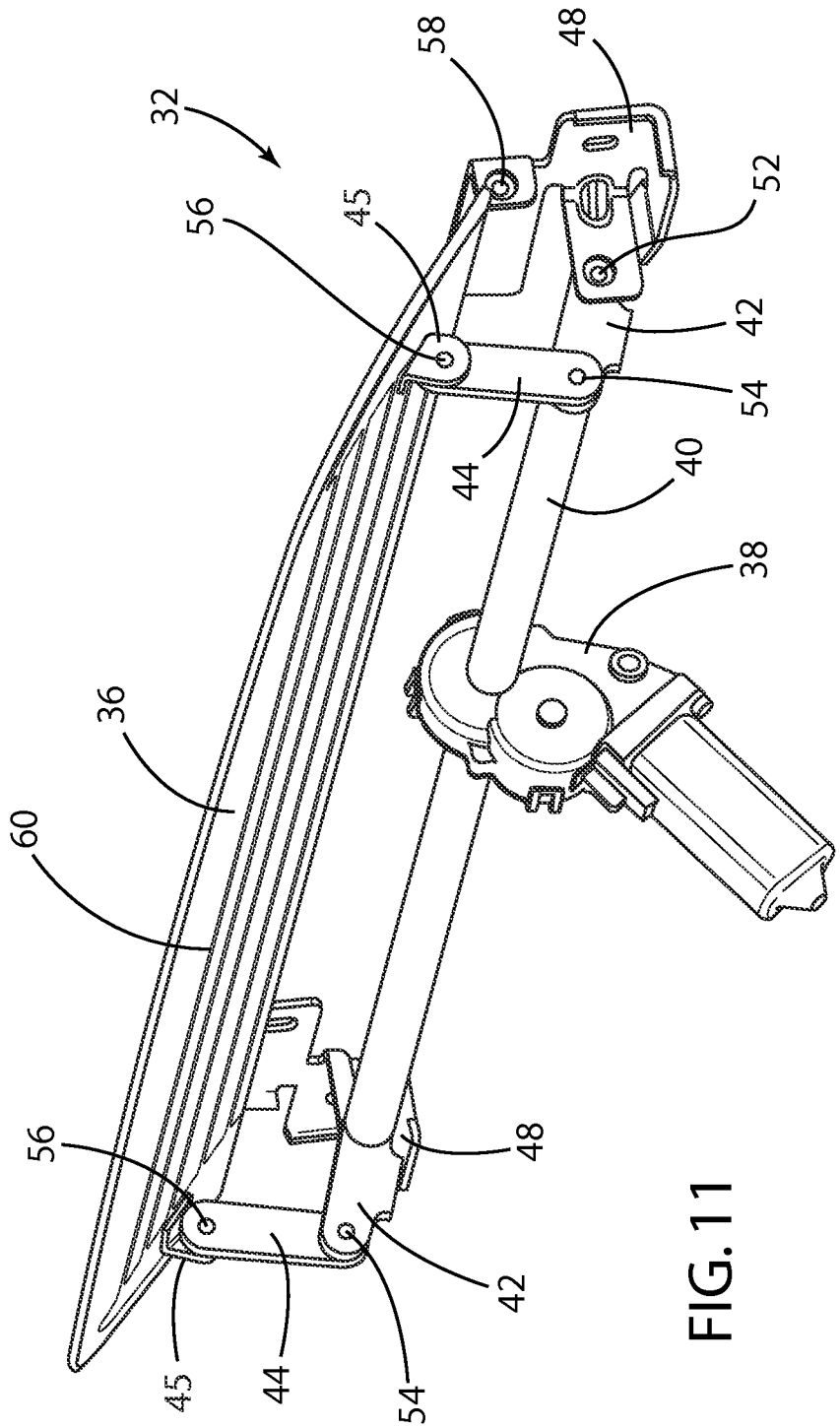
FIG. 11 is a front perspective view (i.e., facing rearward relative to the front of the vehicle) of an articulating backlite assembly according to an alternative embodiment having a two lever armature assembly shown in a position intermediate to the deployed and stowed positions.

For example, the pivoting armature assembly in one embodiment (shown in FIG. 6C and FIG. 11) may have two lever arms (bars) (i.e., a two bar assembly). In such an embodiment, as illustrated in FIG. 11, one of the lever arms 42 is engaged to the driveshaft 40 and the other lever arm 44, instead of being pivotally engaged to a first end of a third lever arm 46 (as in FIG. 5), is engaged to the backlite pane 36 at a predetermined distance from the pivot axis of the backlite pane 36. In one approach, the second lever arm 44 may be engaged to the backlite pane 36 by being engaged to an intermediary mount 45, which in turn is engaged to the backlite pane 36, as shown in FIG. 11. In another approach, the second lever arm 44 may be connected to a latch or the like and the latch may be in turn engaged to the backlite pane 36 directly, or via the mount 45.

The pivoting armature assembly can range from 1 to 9 lever arms (bars) and configured to address the structural components of the vehicle 34. For example, the vehicle 34 may have an obstruction that limits the travel path of the backlite pane 36. The pivoting armature assemblies according to the present embodiments can be configured to provide the geometries to allow the articulating travel path of the backlite pane 36 to avoid such obstructions. For example, the lever assembly can be configured to be fully retracted without touching the back of a passenger seat in its fully reclined position. In the preferred embodiments, the backlite pane 36 is articulated using pivots, but the backlite pane 36 may be articulating using means other than pivots. The armature assembly can be formed from a variety of materials such as metals, composites, polymers, combinations thereof and the like.

The armature assembly illustrated in FIG. 5 has a first lever arm 42 engaged to the driveshaft 40, which is free to pivot around pivot point 52 at a first end. At a second end of the first lever arm 42, a second pivot point 54 pivotally engages a first end of a second lever arm 44. A second end of the second lever arm 44 in turn pivotally engages a first end of a third lever arm 46 at a pivot point 56. A second end of a third lever arm 46 is pivotally mounted to a mounting bracket 48 at a fourth pivot point 58. The third lever arm 46 also has a mount 50 to mount the third lever arm 46 to the backlite 36. It is noted that the two armature mechanisms may have various configurations additional to those illustrated. For example, the two armature mechanisms on each side of the backlite 36 may be mirror images of each other or may be identical to each other. As shown, at least a portion of mounting bracket 50 mounts to the backlite 36 at or about midway along the height of the backlite 36. This position of the mounting bracket 50 allows the articulating backlite assembly 32 to have a less substantial mounting bracket than is known in the art for brackets mounted along the bottom of a vehicle window using push-pull mechanisms. In preferred embodiments, the bracket 50 can be up to 60 percent lighter than a conventional bracket mounted along the bottom of a window. Further, the bracket configuration where at least a portion of mounting bracket 50 mounts to the backlite 36 at or about midway along its height allows for the backlite 36 itself to be thinner that known in the art, thus further reducing vehicle weight.

A schematic of the orientation of the lever arms and pivot points of the illustrated armatures is shown in FIGS. 6A and 6B. Specifically, the orientation of the components are shown when backlite 36 is deployed (closed) (FIG. 6A) and when the backlite 36 is retracted (stowed) to open the vehicle surface opening (FIG. 6B). As shown, the degree of cantilevering of the backlite 36 can be adjusted by the distance between pivot points 54 and 56 relative to the distance between pivot points 52 and 58. Many alternative configurations are possible.

It is also noteworthy that at the end of the travel of the driveshaft 40, pivot point 54 crosses over a centerline 80 between the pivot points 52 and 56 (Cf. FIGS. 6A and 6B). As pivot point 54 crosses over centerline 80, the backlite 36 is at its furthest extension. This would typically result in an additional force against the opening seal 64 of the vehicle 34. As pivot point 54 crosses over centerline 80, backlite 36 will retract slightly, but would still be configured to provide a desired seal around seal 64. This final "over-center" position of pivot point 54 allows the backlite to be locked into position until the motive force 38 reverses direction to open the backlite 36. An over-center angle 62 can be in the range of about 0.01 to 15 degrees (and specifically 0.01 to 15 degrees), and preferably (as shown in FIG. 6a) at about 10 degrees. Thus, seal 64 is made of a sealing material that is plastically deformable (i.e., retaining its cohesion as a single object) to allow displacement as the pivot assembly crosses over centerline 80, while also providing a weather-tight seal in its final over-center position. It is noted that in other embodiments where an over-center position is not present, the backlite 36 could also be locked in place using a center latch or a hydraulic piston to hold/lock the panel in place and to hold the panel against the seal 64, to maintain desired degree of weather seal.

While the invention herein disclosed has been described by means of specific embodiments, examples and applications thereof, numerous modifications and variations could be made thereto by those skilled in the art without departing from the scope of the invention set forth in the claims.

I claim:

1. A vehicle backlite assembly movable between an open position and a closed position, comprising:
    a backlite pane pivotably attached about an axis, the axis, about which the backlite pane is pivotable, is fixed with respect to the vehicle and fixed with respect to the backlite pane;
    at least one lever assembly pivotably connected to the backlite pane to permit articulating movement of the backlite pane; and
    a motive force connected to a rotatable driveshaft, the driveshaft connected to the at least one lever assembly;
    wherein rotation of the driveshaft in response to the motive force causes movement of the at least one lever assembly and articulation of the the backlite pane;
    wherein the at least one lever assembly is a three bar assembly, and wherein the three bar assembly includes having first, second and third pivot points and is configured to lock the backlite pane in a closed position by being over-centered in the closed position, wherein in the closed position the first pivot point is on a different side of a centerline between the second and the third pivot points in relation to the open position; and
    wherein a first bar of the three bar assembly has the first pivot point on a first bar end and a single fourth pivot point attached to the vehicle at a second bar end.

2. The backlite assembly of claim 1, wherein the motive force is an electric motor.

3. The backlite assembly of claim 1, wherein the three bar assembly is over-centered by about 0.01 to about 15 degrees in relation to the centerline and a line between the first pivot point and either of the second and the third pivot points.

4. The backlite assembly of claim 3, wherein the three bar assembly is over-centered by about 10 degrees.

5. The backlite assembly of claim 1, further comprising a plastically deformable backlite seal adapted to allow displacement as the three bar assembly crosses over a centerline, and adapted to provide a weather tight seal in the closed position.

6. The backlite assembly of claim 1, wherein the three bar assembly includes a first lever arm engaged at a first end to the driveshaft and at a second end to a first end of a second lever arm, the second lever arm having a second end that engages a first end of a third lever arm, the third lever arm having a second end that engages the backlite pane.

7. The backlite assembly of claim 1, further comprising a housing to house at least the driveshaft and the motive force.

8. The backlite assembly of claim 1, further comprising a user activated controller to actuate the backlite pane between the open position and the closed position.

9. The backlite assembly of claim 1, wherein the at least one lever assembly is pivotably connected to the backlite pane by a mounting bracket mounted to the backlite pane proximate a midpoint of a height of the backlite pane.

10. The backlite assembly of claim 1, wherein the at least one lever assembly is a two bar assembly.

11. The backlite assembly of claim 10, wherein the two bar assembly includes a first lever arm engaged to the driveshaft and a second lever arm engaged to the backlite pane.

12. The backlite assembly of claim 11, wherein the second lever arm engaged to the backlite pane at a predetermined distance away from the axis about which the backlite pane pivots.

13. The backlight assembly of claim 11, wherein the second lever arm is engaged to the backlite pane.

14. The backlight assembly of claim 13, wherein the second lever arm is engaged to an intermediary mount and the intermediary mount is engaged to the backlite pane.

15. A vehicle, comprising:
   a backlite assembly movable between an open position and a closed position, comprising:
   a backlite pane pivotably attached about an axis, the axis, about which the backlite pane is pivotable, is fixed with respect to the vehicle and fixed with respect to the backlite pane;
   at least one lever assembly pivotably connected to the backlite pane to permit articulating movement of the backlite pane; and
   a motive force connected to a rotatable driveshaft, the driveshaft connected to the at least one lever assembly;
   wherein rotation of the driveshaft in response to the motive force causes movement of the at least one lever assembly and articulation of the backlite pane;
   wherein the at least one lever assembly is a three bar assembly, and wherein the three bar assembly includes having first, second and third pivot points and is configured to lock the backlite pane in a closed position by being over-centered in the closed position, wherein in the closed position the first pivot point is on a different side of a centerline between the second and the third pivot points in relation to the open position; and
   wherein a first bar of the three bar assembly has the first pivot point on a first bar end and a single fourth pivot point attached to the vehicle at a second bar end.

16. A method of moving a backlite assembly for a vehicle between an open position and a closed position, comprising:
   pivotably attaching a backlite pane, attached about an axis, the axis, about which the backlite pane is pivotable, is fixed with respect to the vehicle and fixed with respect to the backlite pane;
   providing at least one lever assembly pivotably connected to the backlite pane;
   wherein the at least one lever assembly is a three bar assembly;
   wherein the three bar assembly includes having first, second and third pivot points and is configured to lock the backlite pane in a closed position by being over-centered in the closed position, wherein in the closed position the first pivot point is on a different side of a centerline between the second and the third pivot points in relation to the open position; and
   wherein a first bar of the three bar assembly has the first pivot point on a first bar end and a single fourth pivot point attached to the vehicle at a second bar end;
   providing a motive force connected to a rotatable driveshaft connected to the at least one lever assembly; and
   articulating the backlite pane via movement of the at least one lever assembly moving in response to rotation of the driveshaft caused by the motive force.

\* \* \* \* \*